United States Patent
Kang

(10) Patent No.: US 8,698,855 B2
(45) Date of Patent: Apr. 15, 2014

(54) WHITE BALANCE ADJUSTING METHOD

(75) Inventor: Chihtsung Kang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 157 days.

(21) Appl. No.: 13/503,649

(22) PCT Filed: Feb. 10, 2012

(86) PCT No.: PCT/CN2012/701007
§ 371 (c)(1),
(2), (4) Date: Apr. 23, 2012

(65) Prior Publication Data
US 2013/0201224 A1      Aug. 8, 2013

(51) Int. Cl.
*G09G 5/10* (2006.01)
(52) U.S. Cl.
USPC .......................................... 345/690; 345/89
(58) Field of Classification Search
USPC ....................................... 345/690, 89, 63, 77
See application file for complete search history.

(56) References Cited

U.S. PATENT DOCUMENTS

| | | | |
|---|---|---|---|
| 2004/0155837 A1* | 8/2004 | Yu et al. | 345/63 |
| 2004/0179719 A1* | 9/2004 | Chen et al. | 382/118 |
| 2007/0085816 A1* | 4/2007 | Evanicky et al. | 345/102 |
| 2010/0020193 A1* | 1/2010 | Zhang et al. | 348/223.1 |
| 2011/0153284 A1* | 6/2011 | Li et al. | 703/1 |
| 2012/0155763 A1* | 6/2012 | Zhang et al. | 382/167 |
| 2013/0155121 A1* | 6/2013 | Kang | 345/690 |

* cited by examiner

*Primary Examiner* — Ricardo L Osorio

(57) ABSTRACT

A white balance adjusting method is disclosed. The white balance adjusting method includes obtaining maximum spectral tristimulus values, minimum spectral tristimulus values and spectral tristimulus values of respective gray levels of a red color, a green color and a blue color; computing spectral tristimulus values Y of the middle respective gray levels; setting a chromaticity and setting polynomial functions which varied based on the gray levels in the spectral tristimulus values; establishing relationships between the spectral tristimulus values of three colors in a white field and the polynomial functions of spectral tristimulus values of a color field; utilizing an approximation method to obtain gray level numbers in the white field. In the present invention, since brightness exponentially varies with the gray level, the chromaticity of a white color dot is set to adjust the white field.

12 Claims, 2 Drawing Sheets

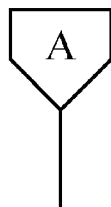

104 — establish polynomial relationships between the spectral tristimulus values of the colors red, green, and blue in a white field of respective gray levels and the spectral tristimulus values of red, green, and blue of respective gray levels according to the above-mentioned chromaticity setting 105 — compute a deviation $\triangle m$ of the gray level values of spectral tristimulus values of the red color in the white field of respective gray levels, a deviation $\triangle l$ of the gray levels of spectral tristimulus values of the green color in the white field of respective gray levels and a deviation $\triangle n$ of the gray level values of spectral tristimulus values of the blue color in the white field of respective gray levels by an approximation method to further obtain gray level numbers m', l', n', of three colors RGB (red, green, blue) in the white field of respective gray levels;

FIG. 1 continue

WHITE BALANCE ADJUSTING METHOD

TECHNICAL FIELD OF THE INVENTION

The present invention relates to a field of display device adjustment, more particularly to a white balance adjusting method for a display device.

BACKGROUND OF THE INVENTION

White field chromaticity coordinates displayed by current display devices such as a liquid crystal display device, a plasma display device, a rear projection display device, and the like, are different from each other, more or less, due to the discrepancies among the displaying principles or hardware designs thereof. If a corresponding white balance adjustment is not executed to the white field chromaticity coordinate discrepancies of the display devices, there will be significant differences in the color display effect among different display devices. Accordingly, white balance tracing and corrections are usually executed during the manufacturing process of the display devices so that a color displayed by the respective display devices tends to be consistent.

Because spectral tristimulus values in a white field are mainly affected by spectral tristimulus values of a green color, therefore, when proceeding a white balance adjustment, the spectral tristimulus values of respective gray levels of the green color in the white field will be firstly obtained since the spectral tristimulus values of the respective gray levels of the green color in the whit field vary exponentially with the gray levels (this means the brightness of the green color exponentially varies with the gray level). Then, spectral tristimulus values of respective gray levels of a red color in the white field and spectral tristimulus values of respective gray levels of a blue color in the white field are adjusted to meet the requirements of the spectral tristimulus values of a white color in the whit field. The spectral tristimulus values of the respective gray levels of the red color in the whit field and the spectral tristimulus values of the respective gray levels of the blue color in the whit field will be obtained. The requirements of setting the chromaticity of all gray levels in the white field may not be satisfied when the spectral tristimulus values of the respective gray levels of the red color in the whit field and the spectral tristimulus values of the respective gray levels of the blue color in the whit field are adjusted in process, so there will be disparities between an adjusted white field and an expected white field.

Therefore, there is a need for a white balance adjusting method to solve the problems existing in the prior art.

SUMMARY OF THE INVENTION

An objective of the present invention is to provide a white balance adjusting method to solve the technical problem, such that disparities occur between the adjusted white field and the expected white field because the current white balance adjusting method could not satisfy the requirements of setting the chromaticity of the white field of all gray levels, based on the fact that the brightness exponentially varies with the gray level, in the method, the chromaticity of the white color dot of each gray level is set and the white balance adjusting is proceeded.

In order to solve the above-mentioned problem, the present invention provides a technical solution as follows:

The present invention relates to a white balance adjusting method, which comprises steps of:

A. obtaining maximum spectral tristimulus values $X_{max}$, $Y_{max}$, and $Z_{max}$, in a chromaticity coordinate system of a tested panel, minimum spectral tristimulus values $X_0$, $Y_0$, and $Z_0$, in the chromaticity coordinate system of the tested panel, spectral tristimulus values $RX_q$, $RY_q$, $RZ_q$, of respective gray levels of a red color of the tested panel, spectral tristimulus values $GX_q$, $GY_q$, $GZ_q$, of the respective gray levels of a green color of the tested panel, and spectral tristimulus values $BX_q$, $BY_q$, $BZ_q$, of the respective gray levels of a blue color of the tested panel, wherein q is a gray level number, and X, Y, Z, are the spectral tristimulus values of the tested panel;

B. computing the spectral tristimulus values $Y_1$ to $Y_{max-1}$ of the middle respective gray levels according to $Y_{max}$ and $Y_0$ since a brightness exponentially varies with the gray level;

C. setting the highest chromaticity of gray levels, establishing polynomial functions $f_{RX}(m)$, $f_{RY}(m)$, $f_{RZ}(m)$, which varied based on the gray levels in the spectral tristimulus values of the red color of the tested panel according to the spectral tristimulus values RXq, RYq, RZq, of respective gray levels of the red color of the tested panel; establishing polynomial functions $f_{GX}(l)$, $f_{GY}(l)$, $f_{GZ}(l)$, which varied based on the gray level numbers in the spectral tristimulus values of the green color of the tested panel according to the spectral tristimulus values GXq, GYq, GZq, of respective gray levels of the green color of the tested panel; establishing polynomial functions $f_{BX}(n)$, $f_{BY}(n)$, $f_{BZ}(n)$, which varied based on the gray level numbers in the spectral tristimulus values of the blue color of the tested panel according to the spectral tristimulus values BXq, BYq, BZq, of respective gray levels of the blue color of the tested panel, where m, l, n, are the gray level numbers;

D. establishing polynomial relationships between the spectral tristimulus values of the colors red, green, and blue in a white field of respective gray levels and the spectral tristimulus values of red, green, and blue of respective gray levels according to the above-mentioned chromaticity setting;

E. computing a deviation $\Delta m$ of the gray level values of spectral tristimulus values of the red color in the white field of respective gray levels, a deviation $\Delta l$ of the gray levels of spectral tristimulus values of the green color in the white field of respective gray levels and a deviation $\Delta n$ of the gray level values of spectral tristimulus values of the blue color in the white field of respective gray levels by an approximation method to further obtain gray level numbers m', l', n', of three colors RGB (red, green, blue) in the white field of respective gray levels;

according to the set chromaticity in step D, establishing relationships between spectral tristimulus values of three colors RGB in the white field of respective gray levels and the polynomial functions of spectral tristimulus values of red, green, and blue of respective gray levels particularly as:

$$X_s = a_{max} * (Y_s/b_{max}) = f_{RX}(m) + f_{GX}(l) + f_{BX}(n);$$

$$Y_s = [(s/\max)^{E} * (Y_{max} - Y_0)] + Y_0 = f_{RY}(m) + f_{GY}(l) + f_{BY}(n);$$

$$Z_s = (1 - a_{max} - b_{max}) * (Y_s/b_{max}) = f_{RZ}(m) + f_{GZ}(l) + f_{BZ}(n);$$

where $X_s$, $Y_s$, $Z_s$ are spectral tristimulus values, s is a gray level number;

the step E including:

E1. predetermining the deviation $\Delta m$ of the gray level values of spectral tristimulus values of red in the white field of respective gray levels, the deviation $\Delta l$ of the gray levels of spectral tristimulus values of green in the white field of respective gray levels and the deviation $\Delta n$ of the gray level values of spectral tristimulus values of blue in the white field of respective gray levels;

E2. calculating ΔX, ΔY, and ΔZ according to the following formulas:

$$X_s' = f_{RX}(m+\Delta m) + f_{GX}(l+\Delta l) + f_{BX}(n+\Delta n);$$

$$Y_s' = f_{RY}(m+\Delta m) + f_{GY}(l+\Delta l) + f_{BY}(n+\Delta n);$$

$$Z_s' = f_{RZ}(m+\Delta m) + f_{GZ}(l+\Delta l) + f_{BZ}(n+\Delta n);$$

$$\Delta X = X_s' - X_s;$$

$$\Delta Y = Y_s' - Y_s;$$

$$\Delta Z = Z_s' - Z_s;$$

if ΔX, ΔY, and ΔZ un-match the above, then going to step E3;

if ΔX, ΔY, and ΔZ match the above, then going to step E4;

E3. substituting m'=m+Δm, l'=l+Δl, n'=n+Δn into the following formula:

$$\begin{vmatrix} \Delta m \\ \Delta l \\ \Delta n \end{vmatrix} = \begin{vmatrix} \delta[f_{RX}(m') + f_{GX}(l') + f_{BX}(n')]/\delta m' & \delta[f_{RX}(m') + f_{GX}(l') + f_{BX}(n')]/\delta l' & \delta[f_{RX}(m') + f_{GX}(l') + f_{BX}(n')]/\delta n' \\ \delta[f_{RY}(m') + f_{GY}(l') + f_{BY}(n')]/\delta m' & \delta[f_{RY}(m') + f_{GY}(l') + f_{BY}(n')]/\delta l' & \delta[f_{RY}(m') + f_{GY}(l') + f_{BY}(n')]/\delta n' \\ \delta[f_{RZ}(m') + f_{GZ}(l') + f_{BZ}(n')]/\delta m' & \delta[f_{RZ}(m') + f_{GZ}(l') + f_{BZ}(n')]/\delta l' & \delta[f_{RZ}(m') + f_{GZ}(l') + f_{BZ}(n')]/\delta n' \end{vmatrix}^{-1} * \begin{vmatrix} \Delta X \\ \Delta Y \\ \Delta Z \end{vmatrix}$$

to obtain new Δm, Δl, Δn, and going to step E2;

E4. outputting the gray level numbers s, m+Δm, l+Δl, and n+Δn.

The white balance adjusting method in accordance with the present invention comprises step B which particularly computes the spectral tristimulus values $Y_1$ to $Y_{max-1}$ of the middle respective gray levels according to $Y_{max}$ and $Y_0$ based on the following formula:

$$Y_t = [(t/\max)^{E} * (Y_{max} - Y_0)] + Y_0;$$

where E is a gamma value, a range of the gamma value is 2.0~2.4, and a range of t is 1~(max-1).

In the white balance adjusting method in accordance with the present invention, the gamma value is 2.2.

In the white balance adjusting method in accordance with the present invention, setting the highest chromaticity of the gray levels in step C particularly comprises making chromaticity of the white field of each gray level be equal to the chromaticity of the white field of maximum gray level, that is:

$$a_p = a_{max} = X_{max}/(X_{max} + Y_{max} + Z_{max}),$$

$$b_p = b_{max} = Y_{max}/(X_{max} + Y_{max} + Z_{max});$$

where $a_p$, $b_p$ are the chromaticities of the white field of respective gray levels, and p is a gray level number.

In the white balance adjusting method in accordance with the present invention, the polynomial functions $f_{RX}(m)$, $f_{RY}(m)$, $f_{RZ}(m)$, $f_{GX}(l)$, $f_{GY}(l)$, $f_{GZ}(l)$, $f_{BX}(n)$, $f_{BY}(n)$, and $f_{BZ}(n)$ in step C are cubic polynomial functions.

The present invention relates to a white balance adjusting method, which comprises steps of:

A. obtaining maximum spectral tristimulus values $X_{max}$, $Y_{max}$, and $Z_{max}$ in a chromaticity coordinate system of a tested panel, minimum spectral tristimulus values $X_0$, $Y_0$, and $Z_0$ in the chromaticity coordinate system of the tested panel, spectral tristimulus values $RX_q$, $RY_q$, $RZ_q$, of respective gray levels of a red color of the tested panel, spectral tristimulus values $GX_q$, $GY_q$, $GZ_q$, of the respective gray levels of a green color of the tested panel, and spectral tristimulus values $BX_q$, $BY_q$, $BZ_q$, of the respective gray levels of a blue color of the tested panel, where q is a gray level number, and X, Y, Z, are the spectral tristimulus values of the tested panel;

B. computing the spectral tristimulus values $Y_1$ to $Y_{max-1}$ of the middle respective gray levels according to $Y_{max}$ and $Y_0$ since a brightness exponentially varies with the gray level;

C. setting the highest chromaticity of gray levels, setting polynomial functions $f_{RX}(m)$, $f_{RY}(m)$, $f_{RZ}(m)$, which varied based on the gray levels in the spectral tristimulus values of the red color of the tested panel according to the spectral tristimulus values $RX_q$, $RY_q$, $RZ_q$, of respective gray levels of the red color of the tested panel; setting polynomial functions $f_{GX}(l)$, $f_{GY}(l)$, $f_{GZ}(l)$, which varied based on the gray level numbers in the spectral tristimulus values of the green color of the tested panel according to the spectral tristimulus values $GX_q$, $GY_q$, $GZ_q$, of respective gray levels of the green color of the tested panel; setting polynomial functions $f_{BX}(n)$, $f_{BY}(n)$, $f_{BZ}(n)$, which varied based on the gray level numbers in the spectral tristimulus values of the blue color of the tested panel according to the spectral tristimulus values $BX_q$, $BY_q$, $BZ_q$, of respective gray levels of the blue color of the tested panel, where m, l, n, are the gray level numbers;

D. establishing polynomial relationships between the spectral tristimulus values of three colors red, green, and blue in a white field of respective gray levels and the spectral tristimulus values of red, green, and blue of respective gray levels according to the set chromaticity;

E. computing a deviation Δm of the gray level values of spectral tristimulus values of the red color in the white field of respective gray levels, a deviation Δl of the gray levels of spectral tristimulus values of the green color in the white field of respective gray levels and a deviation Δn of the gray level values of spectral tristimulus values of the blue color in the white field of respective gray levels by an approximation method to further obtain gray level numbers m', l', n', of three colors RGB in the white field of respective gray levels;

In the white balance adjusting method in accordance with the present invention, the step B particularly comprises computing the spectral tristimulus values $Y_1$ to $Y_{max-1}$ of the middle respective gray levels according to $Y_{max}$ and $Y_0$ based on the following formula:

$$Y_t = [(t/\max)^{E} * (Y_{max} - Y_0)] + Y_0;$$

where E is a gamma value, a range of the gamma value is 2.0~2.4, and a range of t is 1~(max-1).

In the white balance adjusting method in accordance with the present invention, the gamma value is 2.2.

In the white balance adjusting method in accordance with the present invention, setting the highest chromaticity of the gray levels in step C particularly comprises making chromaticity of the white field of each gray levels be equal to the chromaticity of the white field of maximum gray level, that is:

$$a_p = a_{max} = X_{max}/(X_{max} + Y_{max} + Z_{max}),$$

$$b_p = b_{max} = Y_{max}/(X_{max} + Y_{max} + Z_{max});$$

where $a_p$, $b_p$ are the chromaticities of the white field of respective gray levels, and p is gray level number.

In the white balance adjusting method in accordance with the present invention, the polynomial function $f_{RX}(m)$, $f_{RY}(m)$, $f_{RZ}(m)$, $f_{GX}(l)$, $f_{GY}(l)$, $f_{GZ}(l)$, $f_{BX}(n)$, $f^{BY}(n)$, and $f_{BZ}(n)$ in step C are cubic polynomial functions.

In the white balance adjusting method in accordance with the present invention, the step D particularly comprises according to the set chromaticity, the established relationships between spectral tristimulus values of three colors RGB in the white field of respective gray levels and the polynomial functions of spectral tristimulus values of red, green, and blue of respective gray levels particularly as:

$$X_s = a_{max} * (Y_s/b_{max}) = f_{RX}(m) + f_{GX}(l) + f_{BX}(n);$$

$$Y_s = [(s/\max)^E * (Y_{max} - Y_0)] + Y_0 = f_{RY}(m) + f_{GY}(l) + f_{BY}(n);$$

$$Z_s = (1 - a_{max} - b_{max}) * (Y_s/b_{max}) = f_{RZ}(m) + f_{GZ}(l) + f_{BZ}(n);$$

where $X_s$, $Y_s$, $Z_s$ are spectral tristimulus values, s is a gray level number.

In the white balance adjusting method in accordance with the present invention, the step E particularly comprises:

E1. predetermining the deviation $\Delta m$ of the gray level values of spectral tristimulus values of red in the white field of respective gray levels, the deviation $\Delta l$ of the gray levels of spectral tristimulus values of green in the white field of respective gray levels and the deviation $\Delta n$ of the gray level values of spectral tristimulus values of blue in the white field of respective gray levels;

E2. calculating $\Delta X$, $\Delta Y$, and $\Delta Z$ according to the following formulas:

$$X_s' = f_{RX}(m+\Delta m) + f_{GX}(l+\Delta l) + f_{BX}(n+\Delta n);$$

$$Y_s' = f_{RY}(m+\Delta m) + f_{GY}(l+\Delta l) + f_{BY}(n+\Delta n);$$

$$Z_s' = f_{RZ}(m+\Delta m) + f_{GZ}(l+\Delta l) + f_{BZ}(n+\Delta n);$$

$$\Delta X = X_s' - X_s;$$

$$\Delta Y = Y_s' - Y_s;$$

$$\Delta Z = Z_s' - Z_s;$$

if $\Delta X$, $\Delta Y$, and $\Delta Z$ un-match the above, then going to step E3;

if $\Delta X$, $\Delta Y$, and $\Delta Z$ match the above, then going to step E4;

E3. substituting $m' = m + \Delta m$, $l' = l + \Delta l$, $n' = n + \Delta n$ into the following formula:

$$\begin{vmatrix} \Delta m \\ \Delta l \\ \Delta n \end{vmatrix} = \begin{vmatrix} \delta[f_{RX}(m') + f_{GX}(l') + f_{BX}(n')]/\delta m' & \delta[f_{RX}(m') + f_{GX}(l') + f_{BX}(n')]/\delta l' & \delta[f_{RX}(m') + f_{GX}(l') + f_{BX}(n')]/\delta n' \\ \delta[f_{RY}(m') + f_{GY}(l') + f_{BY}(n')]/\delta m' & \delta[f_{RY}(m') + f_{GY}(l') + f_{BY}(n')]/\delta l' & \delta[f_{RY}(m') + f_{GY}(l') + f_{BY}(n')]/\delta n' \\ \delta[f_{RZ}(m') + f_{GZ}(l') + f_{BZ}(n')]/\delta m' & \delta[f_{RZ}(m') + f_{GZ}(l') + f_{BZ}(n')]/\delta l' & \delta[f_{RZ}(m') + f_{GZ}(l') + f_{BZ}(n')]/\delta n' \end{vmatrix}^{-1} * \begin{vmatrix} \Delta X \\ \Delta Y \\ \Delta Z \end{vmatrix}$$

to obtain new $\Delta m$, $\Delta l$, $\Delta n$, and going to step E2;

E4. outputting the gray level numbers s, $m+\Delta m$, $l+\Delta l$, and $n+\Delta n$.

There are some advantages in the white balance adjusting method of the present invention as followings: the technical problems, such that disparities occur between the adjusted white field and the expected white field because the current white balance adjusting method could not satisfy the requirements of setting the chromaticity of the white field of all gray levels, based on a fact that the brightness exponentially varies with the gray level, in the method, the chromaticity of the white color dot of each gray level is set and the white balance adjusting is proceeded.

For a better understanding of the aforementioned content of the present invention, a preferred embodiment is described in detail in conjunction with the appending FIGURE as follows.

DETAILED DESCRIPTION OF THE INVENTION

Figure 1:
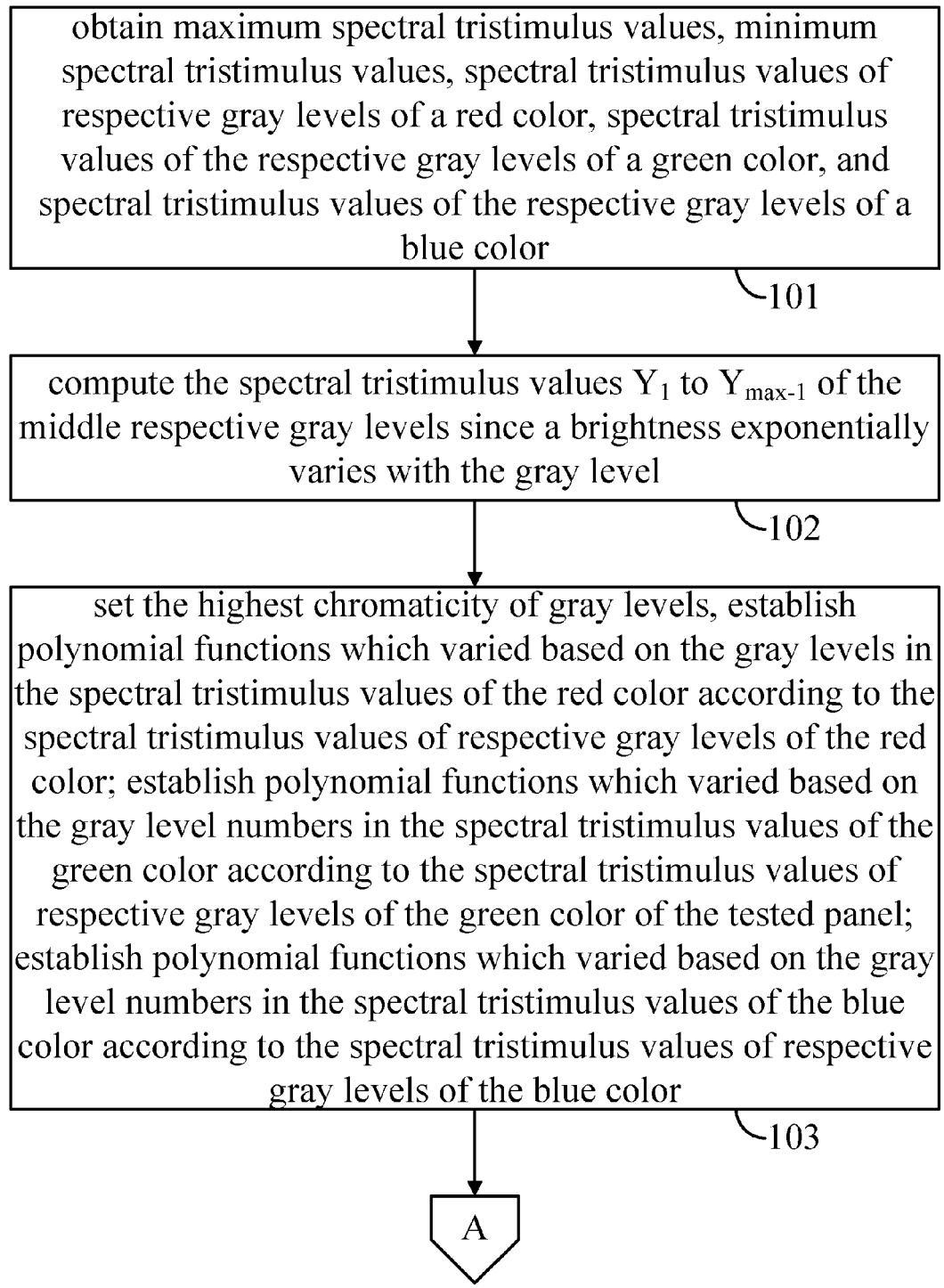
FIG. 1. is a flow chart of a white balance adjusting method in accordance with a preferred embodiment of the present invention.

The respective embodiments will be described with reference to the appending drawings as follows, and they are specific embodiments for exemplifying that the present invention is able to be put into practice.

The present invention involves a white balance adjusting method, such as FIG. 1. illustrating a flow chart of the white balance adjusting method in accordance with a preferred embodiment of the present invention. The white balance adjusting method starts as follows:

Step 101. obtaining the maximum spectral tristimulus values, the highest gray level of the spectral tristimulus value, $X_{max}$, $Y_{max}$, and $Z_{max}$ in a chromaticity coordinate system of a tested panel (e.g. CIE1931), obtaining the minimum spectral tristimulus values, the lowest gray level of the spectral tristimulus value, $X_0$, $Y_0$, and $Z_0$ in the chromaticity coordinate system of the tested panel, obtaining the spectral tristimulus values $RX_q$, $RY_q$, $RZ_q$, of respective gray levels of a red color of the tested panel, the spectral tristimulus values $GX_q$, $GY_q$, $GZ_q$, of the respective gray levels of a green color of the tested panel, and the spectral tristimulus values $BX_q$, $BY_q$, $BZ_q$, of the respective gray levels of a blue color of the tested panel, where q is a gray level number, and X, Y, Z, are the spectral tristimulus values of the tested panel;

Step 102. computing the spectral tristimulus values $Y_1$ to $Y_{max-1}$ of the middle respective gray levels (i.e. gray levels without the highest gray level and the lowest gray level), according to $Y_{max}$ and $Y_0$ since a brightness exponentially varies with the gray level;

Step 103. setting the highest chromaticity of gray levels, setting polynomial functions $f_{RX}(m)$, $f_{RY}(m)$, $f_{RZ}(m)$, which vary based on the gray levels in the spectral tristimulus values of the red color of the tested panel according to the spectral tristimulus values $RX_q$, $RY_q$, $RZ_q$, of respective gray levels of the red color of the tested panel; setting polynomial functions $f_{GX}(l)$, $f_{GY}(l)$, $f_{GZ}(l)$, which vary based on the gray level numbers in the spectral tristimulus values of the green color of the tested panel according to the spectral tristimulus values $GX_q$, $GY_q$, $GZ_q$, of respective gray levels of the green color of the tested panel; setting polynomial functions $f_{BX}(n)$, $f_{BY}(n)$, $f_{BZ}(n)$, which vary based on the gray level numbers in the spectral tristimulus values of the blue color of the tested panel according to the spectral tristimulus values $BX_q$, $BY_q$, $BZ_q$, of respective gray levels of the blue color of the tested panel, where m, l, n, are the gray level numbers;

Step 104. establishing relationships between the spectral tristimulus values of three colors red, green, and blue in a white field of respective gray levels and the polynomial functions of spectral tristimulus values of red, green, and blue of respective gray levels according to the set chromaticity;

Step 105. computing a deviation $\Delta m$ of the gray level values of spectral tristimulus values of the red color in the white field of respective gray levels, a deviation $\Delta l$ of the gray levels of spectral tristimulus values of the green color in the white field of respective gray levels and a deviation $\Delta n$ of the gray level values of spectral tristimulus values of the blue color in the white field of respective gray levels by an approximation method to further obtain gray level numbers m', l', n', of three colors RGB in the white field of respective gray levels;

Details of each step mentioned above will be described with 256 gray levels (max=255) as an example in the following:

Step 101 particularly comprises obtaining the maximum spectral tristimulus values $X_{255}$, $Y_{255}$, and $Z_{255}$ for a tested panel and the minimum spectral tristimulus values $X_0$, $Y_0$, and $Z_0$ of the tested panel, then measuring the spectral tristimulus values of 256 gray levels of three colors RGB of the tested panel, the spectral tristimulus values of 256 gray levels of three colors RGB of the tested panel includes the spectral tristimulus values $RX_q$, $RY_q$, $RZ_q$ of respective gray levels of a red color, the spectral tristimulus values $GX_q$, $GY_q$, $GZ_q$ of the respective gray levels of a green color, and the spectral tristimulus values $BX_q$, $BY_q$, $BZ_q$, of the respective gray levels of a blue color, where q is a gray level number and the range of q is 0-255.

Step 102 particularly comprises computing the spectral tristimulus values $Y_1$ to $Y_{254}$ of the middle respective gray levels according to $Y_{255}$ and $Y_0$ using the following formula since a brightness exponentially varies with the gray level;

$$Y_t = [(t/255)^E * (Y_{255} - Y_0)] + Y_0;$$

where E is a gamma value, a range of the gamma value is 2.0~2.4, preferably 2.2, and a range of t is 1~254.

Step 103 particularly comprises setting the highest chromaticity of gray levels, such that chromaticity of the white field of each gray level is equal to chromaticity of the white field of maximum gray level, that is:

$$a_p = a_{255} = X_{255}/(X_{255} + Y_{255} + Z_{255}),$$

$$b_p = b_{255} = Y_{255}/(X_{255} + Y_{255} + Z_{255});$$

where $a_p$, $b_p$ are the chromaticity of the white field of respective gray levels (e.g. $a_{255}$, $b_{255}$ are the chromaticity of the highest gray levels), where p is a gray level number, and a range of p is 0-255.

Then, the polynomial functions $f_{RX}(m)$, $f_{RY}(m)$, $f_{RZ}(m)$ which vary based on the gray levels in the spectral tristimulus values of the red color of the tested panel will be set according to the spectral tristimulus values $RX_q$, $RY_q$, $RZ_q$ of respective gray levels of the red color of the tested panel;

where $f_{RX}(m)$ is a polynomial function of a variable m which is set according to $RX_q$ (q=0-255), $f_{RY}(m)$ is a polynomial function of a variable m which is set according to $RY_q$ (q=0-255), $f_{RZ}(m)$ is a polynomial function of a variable m which is set according to $RZ_q$ (q=0-255);

the polynomial functions $f_{GX}(l)$, $f_{GY}(l)$, $f_{GZ}(l)$, which vary based on the gray level numbers in the spectral tristimulus values of the green color of the tested panel will be set according to the spectral tristimulus values $GX_q$, $GY_q$, $GZ_q$, of respective gray levels of the green color of the tested panel;

where $f_{GX}(l)$ is a polynomial function of a variable l which is set according to $GX_q$ (q=0-255), $f_{GY}(l)$ is a polynomial function of a variable l which is set according to $GY_q$ (q=0-255), $f_{GZ}(l)$ is a polynomial function of a variable l which is set according to $GZ_q$ (q=0-255);

the polynomial functions $f_{BX}(n)$, $f_{BY}(n)$, $f_{BZ}(n)$, which vary based on the gray level numbers in the spectral tristimulus values of the blue color of the tested panel will be set according to the spectral tristimulus values $BX_q$, $BY_q$, $BZ_q$, of respective gray levels of the blue color of the tested panel;

where $f_{BX}(n)$ is a polynomial function of a variable n which is set according to $BX_q$ (q=0-255), $f_{BY}(n)$ is a polynomial function of a variable n which is set according to $BY_q$ (q=0-255), $f_{BZ}(n)$ is a polynomial function of a variable n which is set according to $BZ_q$ (q=0-255);

where m, l, n are the gray level numbers, and the polynomial functions $f_{RX}(m)$, $f_{RY}(m)$, $f_{RZ}(m)$, $f_{GX}(l)$, $f_{GY}(l)$, $f_{GZ}(l)$, $f_{BX}(n)$, $f_{BY}(n)$, and $f_{BZ}(n)$ in step C are cubic polynomial functions, for example, $f_{RX}(m) = c*m^3 + d*m^2 + e*m + f$, where c, d, e, and f, are constant.

Step 104 particularly comprises establishing polynomial relationships between the spectral tristimulus values of three colors red, green, and blue in a white field of respective gray levels and the spectral tristimulus values of red (R), green (G), and blue (B) of respective gray levels according to the set chromaticity in the above step;

$$X_s = a_{255} * (Y_s/b_{255}) = f_{RX}(m) + f_{GX}(l) + f_{BX}(n);$$

$$Y_s = [(s/255)^E * (Y_{255} - Y_0)] + Y_0 = f_{RY}(m) + f_{GY}(l) + f_{BY}(n);$$

$$Z_s = (1 - a_{255} - b_{255}) * (Y_s/b_{255}) = f_{RZ}(m) + f_{GZ}(l) + f_{BZ}(n);$$

where $X_s$, $Y_s$, $Z_s$ are spectral tristimulus values, s is a gray level number;

Step 105 particularly comprises predetermining the deviation $\Delta m$ of the gray level values of spectral tristimulus values of red in the white field of respective gray levels, the deviation $\Delta l$ of the gray levels of spectral tristimulus values of green in the white field of respective gray levels and the deviation $\Delta n$ of the gray level values of spectral tristimulus values of blue in the white field of respective gray levels; calculating $\Delta X$, $\Delta Y$, and $\Delta Z$ according to the following formulas:

$$X_s' = f_{RX}(m + \Delta m) + f_{GX}(l + \Delta l) + f_{BX}(n + \Delta n);$$

$$Y_s' = f_{RY}(m + \Delta m) + f_{GY}(l + \Delta l) + f_{BY}(n + \Delta n);$$

$$Z_s' = f_{RZ}(m + \Delta m) + f_{GZ}(l + \Delta l) + f_{BZ}(n + \Delta n);$$

$$\Delta X = X_s' - X_s;$$

$$\Delta Y = Y_s' - Y_s;$$

$$\Delta Z = Z_s' - Z_s;$$

if $\Delta X$, $\Delta Y$, and $\Delta Z$ un-match the above (the deviation is out of the predetermined range), then the following approximation method is utilized, and m''=m+$\Delta m$, l'=l+$\Delta l$, n'=n+$\Delta n$, are substituted into the following formula:

$$\begin{vmatrix} \Delta m \\ \Delta l \\ \Delta n \end{vmatrix} = \begin{vmatrix} \delta[f_{RX}(m') + f_{GX}(l') + f_{BX}(n')]/\delta m' & \delta[f_{RX}(m') + f_{GX}(l') + f_{BX}(n')]/\delta l' & \delta[f_{RX}(m') + f_{GX}(l') + f_{BX}(n')]/\delta n' \\ \delta[f_{RY}(m') + f_{GY}(l') + f_{BY}(n')]/\delta m' & \delta[f_{RY}(m') + f_{GY}(l') + f_{BY}(n')]/\delta l' & \delta[f_{RY}(m') + f_{GY}(l') + f_{BY}(n')]/\delta n' \\ \delta[f_{RZ}(m') + f_{GZ}(l') + f_{BZ}(n')]/\delta m' & \delta[f_{RZ}(m') + f_{GZ}(l') + f_{BZ}(n')]/\delta l' & \delta[f_{RZ}(m') + f_{GZ}(l') + f_{BZ}(n')]/\delta n' \end{vmatrix}^{-1} * \begin{vmatrix} \Delta X \\ \Delta Y \\ \Delta Z \end{vmatrix}$$

to obtain new $\Delta m$, $\Delta l$, $\Delta n$, and recalculate whether $\Delta X = X_s' - X_s$ match the above or not, and so on whether $\Delta Y$, $\Delta Z$, match the above or not, until $\Delta X$, $\Delta Y$, $\Delta Z$, all match the above. If $\Delta X$, $\Delta Y$, and $\Delta Z$ match the above (the deviation is in the predetermined range), then the calculation will stop, and the gray level numbers s, m+$\Delta$m, l+$\Delta$l, and n+$\Delta$n will be output. Making gray level numbers decrease progressively from s=254 to s=0 to compute $\Delta$m, $\Delta$l, and $\Delta$n of the respective gray levels to obtain gray level numbers m', l', n', of three colors red, green, and blue in a white field of respective gray levels (the gray level number is s).

In the white balance adjusting method of the present invention, based on a fact that the brightness exponentially varies with the gray level, the chromaticity of the white color dot of each gray level is set and the white balance adjusting is proceeded, and thus the technical problems, such as disparities between the adjusted white field and the expected white field because the current white balance adjusting method could not satisfy the requirements of setting the chromaticity of the white field of all gray levels, are effectively solved To sum up, the present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A white balance adjusting method, comprising steps of:
A. obtaining maximum spectral tristimulus values $X_{max}$, $Y_{max}$, and $Z_{max}$ in a chromaticity coordinate system for a tested panel, minimum spectral tristimulus values $X_0$, $Y_0$, and $Z_0$ in the chromaticity coordinate system of the tested panel, spectral tristimulus values $RX_q$, $RY_q$, $RZ_q$, of respective gray levels of a red color of the tested panel, spectral tristimulus values $GX_q$, $GY_q$, $GZ_q$, of the respective gray levels of a green color of the tested panel, and spectral tristimulus values $BX_q$, $BY_q$, $BZ_q$, of the respective gray levels of a blue color of the tested panel, where q is a gray level number, and X, Y, Z, are the spectral tristimulus values of the tested panel;
B. computing the spectral tristimulus values $Y_1$ to $Y_{max-1}$ of the middle respective gray levels according to $Y_{max}$ and $Y_0$ since a brightness exponentially varies with the gray level;
C. setting the highest chromaticity of the gray levels, setting polynomial functions $f_{RX}(m)$, $f_{RY}(m)$, $f_{RZ}(m)$, which vary based on the gray levels in the spectral tristimulus values of the red color of the tested panel according to the spectral tristimulus values $RX_q$, $RY_q$, $RZ_q$, of respective gray levels of the red color of the tested panel; setting polynomial functions $f_{GX}(l)$, $f_{GY}(l)$, $f_{GZ}(l)$, which vary based on the gray level numbers in the spectral tristimulus values of the green color of the tested panel according to the spectral tristimulus values $GX_q$, $GY_q$, $GZ_q$, of respective gray levels of the green color of the tested panel; setting polynomial functions $f_{BX}(n)$, $f_{BY}(n)$, $f_{BZ}(n)$, which vary based on the gray level numbers in the spectral tristimulus values of the blue color of the tested panel according to the spectral tristimulus values $BX_q$, $BY_q$, $BZ_q$, of respective gray levels of the blue color of the tested panel, where m, l, n, are the gray level numbers;
D. establishing polynomial relationships between the spectral tristimulus values of three colors red, green, and blue in a white field of respective gray levels and the spectral tristimulus values of red, green, and blue of respective gray levels according to the set chromaticity;
E. computing a deviation $\Delta$m of the gray level values of spectral tristimulus values of the red color in the white field of respective gray levels, a deviation $\Delta$l of the gray levels of spectral tristimulus values of the green color in the white field of respective gray levels and a deviation $\Delta$n of the gray level values of spectral tristimulus values of the blue color in the white field of respective gray levels to further obtain gray level numbers m', l', n', of three colors RGB (red, green, blue) in the white field of respective gray levels;
in the step D, according to the set chromaticity, the established relationships between spectral tristimulus values of three colors RGB in the white field of respective gray levels and the polynomial functions of spectral tristimulus values of red, green, and blue of respective gray levels particularly being:

$$X_s = a_{max}*(Y_s/b_{max}) = f_{RX}(m) + f_{GX}(l) + f_{BX}(n);$$

$$Y_s = [(s/\max)^E*(Y_{max} - Y_0)] + Y_0 = f_{RY}(m) + f_{GY}(l) + f_{BY}(n);$$

$$Z_s = (1 - a_{max} - b_{max})*(Y_s/b_{max}) = f_{RZ}(m) + f_{GZ}(l) + f_{BZ}(n);$$

where $X_s$, $Y_s$, $Z_s$ are spectral tristimulus values, s is a gray level number;
the step E including:
E1. predetermining the deviation $\Delta$m of the gray level values of spectral tristimulus values of red in the white field of respective gray levels, the deviation $\Delta$l of the gray levels of spectral tristimulus values of green in the white field of respective gray levels and the deviation $\Delta$n of the gray level values of spectral tristimulus values of blue in the white field of respective gray levels;
E2. calculating $\Delta$X, $\Delta$Y, and $\Delta$Z according to the following formulas:

$$X_s' = f_{RX}(m+\Delta m) + f_{GX}(l+\Delta l) + f_{BX}(n+\Delta n);$$

$$Y_s' = f_{RY}(m+\Delta m) + f_{GY}(l+\Delta l) + f_{BY}(n+\Delta n);$$

$$Z_s' = f_{RZ}(m+\Delta m) + f_{GZ}(l+\Delta l) + f_{BZ}(n+\Delta n);$$

$$\Delta X = X_s' - X_s;$$

$$\Delta Y = Y_s' - Y_s;$$

$$\Delta Z = Z_s' - Z_s;$$

if $\Delta$X, $\Delta$Y, and $\Delta$Z un-match the above, then go to step E3;
if $\Delta$X, $\Delta$Y, and $\Delta$Z match the above, then go to step E4;
E3. substituting m'=m+$\Delta$m, l'=l+$\Delta$l, n'=n+$\Delta$n, into the following formula:

$$\begin{vmatrix} \Delta m \\ \Delta l \\ \Delta n \end{vmatrix} = \begin{vmatrix} \delta[f_{RX}(m')+ & \delta[f_{RX}(m')+ & \delta[f_{RX}(m')+ \\ f_{GX}(l')+ & f_{GX}(l')+ & f_{GX}(l')+ \\ f_{BX}(n')]/\delta m' & f_{BX}(n')]/\delta l' & f_{BX}(n')]/\delta n' \\ \delta[f_{RY}(m')+ & \delta[f_{RY}(m')+ & \delta[f_{RY}(m')+ \\ f_{GY}(l')+ & f_{GY}(l')+ & f_{GY}(l')+ \\ f_{BY}(n')]/\delta m' & f_{BY}(n')]/\delta l' & f_{BY}(n')]/\delta n' \\ \delta[f_{RZ}(m')+ & \delta[f_{RZ}(m')+ & \delta[f_{RZ}(m')+ \\ f_{GZ}(l')+ & f_{GZ}(l')+ & f_{GZ}(l')+ \\ f_{BZ}(n')]/\delta m' & f_{BZ}(n')]/\delta l' & f_{BZ}(n')]/\delta n' \end{vmatrix}^{-1} * \begin{vmatrix} \Delta X \\ \Delta Y \\ \Delta Z \end{vmatrix}$$

to obtain new $\Delta$m, $\Delta$l, $\Delta$n, and go to step E2;
E4. outputting the gray level numbers s, m+$\Delta$m, l+$\Delta$l, and n+$\Delta$n.

2. The white balance adjusting method according to claim 1, wherein the step B particularly comprises computing the spectral tristimulus values $Y_1$ to $Y_{max-1}$ of the middle respective gray levels according to $Y_{max}$ and $Y_0$ based on the following formula:

$$Y_t = [(t/\max)^E * (Y_{max} - Y_0)] + Y_0;$$

where E is a gamma value, a range of the gamma value is 2.0~2.4, and a range of t is 1~(max-1).

3. The white balance adjusting method according to claim 2, wherein the gamma value is 2.2.

4. The white balance adjusting method according to claim 1, wherein setting the highest chromaticity of the gray levels in step C particularly comprises making chromaticity of the white field of each gray level be equal to the chromaticity of the white field of maximum gray level, that is:

$$a_p = a_{max} = X_{max}/(X_{max} + Y_{max} + Z_{max}),$$

$$b_p = b_{max} = Y_{max}/(X_{max} + Y_{max} + Z_{max});$$

where $a_p$, $b_p$ are the chromaticity of the white field of respective gray levels, and p is a gray level number.

5. The white balance adjusting method according to claim 4, wherein the polynomial functions $f_{RX}(m)$, $f_{RY}(m)$, $f_{RZ}(m)$, $f_{GX}(l)$, $f_{GY}(l)$, $f_{GZ}(l)$, $f_{BX}(n)$, $f_{BY}(n)$, and $f_{BZ}(n)$ in step C are cubic polynomial functions.

6. A white balance adjusting method, comprising steps of:

A. obtaining maximum spectral tristimulus values $X_{max}$, $Y_{max}$, and $Z_{max}$ in a chromaticity coordinate system for a tested panel, minimum spectral tristimulus values $X_0$, $Y_0$, and $Z_0$ in the chromaticity coordinate system of the tested panel, spectral tristimulus values $RX_q$, $RY_q$, $RZ_q$, of respective gray levels of a red color of the tested panel, spectral tristimulus values $GX_q$, $GY_q$, $GZ_q$, of the respective gray levels of a green color of the tested panel, and spectral tristimulus values $BX_q$, $BY_q$, $BZ_q$, of the respective gray levels of a blue color of the tested panel, where q is a gray level number, and X, Y, Z, are the spectral tristimulus values of the tested panel;

B. computing the spectral tristimulus values $Y_1$ to $Y_{max-1}$ of the middle respective gray levels according to $Y_{max}$ and $Y_0$ since a brightness exponentially varies with the gray level;

C. setting the highest chromaticity of gray levels, setting polynomial functions $f_{RX}(m)$, $f_{RY}(m)$, $f_{RZ}(m)$, which vary based on the gray levels in the spectral tristimulus values of the red color of the tested panel according to the spectral tristimulus values $RX_q$, $RY_q$, $RZ_q$, of respective gray levels of the red color of the tested panel; setting polynomial functions $f_{GX}(l)$, $f_{GY}(l)$, $f_{GZ}(l)$, which vary based on the gray level numbers in the spectral tristimulus values of the green color of the tested panel according to the spectral tristimulus values $GX_q$, $GY_q$, $GZ_q$, of respective gray levels of the green color of the tested panel; setting polynomial functions $f_{BX}(n)$, $f_{BY}(n)$, $f_{BZ}(n)$, which vary based on the gray level numbers in the spectral tristimulus values of the blue color of the tested panel according to the spectral tristimulus values $BX_q$, $BY_q$, $BZ_q$, of respective gray levels of the blue color of the tested panel, where m, l, n, are the gray level numbers;

D. establishing polynomial relationships between the spectral tristimulus values of three colors red, green, and blue in a white field of respective gray levels and the spectral tristimulus values of red, green, and blue of respective gray levels according to the set chromaticity;

E. computing a deviation Δm of the gray level values of spectral tristimulus values of the red color in the white field of respective gray levels, a deviation Δl of the gray levels of spectral tristimulus values of the green color in the white field of respective gray levels and a deviation Δn of the gray level values of spectral tristimulus values of the blue color in the white field of respective gray levels by an approximation method to further obtain gray level numbers m', l', n', of three colors RGB in the white field of respective gray levels.

7. The white balance adjusting method according to claim 6, wherein the step B particularly comprises computing the spectral tristimulus values $Y_1$ to $Y_{max-1}$ of the middle respective gray levels according to $Y_{max}$ and $Y_0$ based on the following formula:

$$Y_t = [(t/\max)^E * (Y_{max} - Y_0)] + Y_0;$$

where E is a gamma value, a range of the gamma value is 2.0~2.4, and a range of t is 1~(max-1).

8. The white balance adjusting method according to claim 7, wherein the gamma value is 2.2.

9. The white balance adjusting method according to claim 6, wherein setting the highest chromaticity of the gray levels in step C particularly comprises making chromaticity of the white field of each gray level be equal to the chromaticity of the white field of maximum gray level, that is:

$$a_p = a_{max} = X_{max}/(X_{max} + Y_{max} + Z_{max}),$$

$$b_p = b_{max} = Y_{max}/(X_{max} + Y_{max} + Z_{max});$$

where $a_p$, $b_p$ are the chromaticity of the white field of respective gray levels, and p is gray level number.

10. The white balance adjusting method according to claim 6, wherein the polynomial function $f_{RX}(m)$, $f_{RY}(m)$, $f_{RZ}(m)$, $f_{GX}(l)$, $f_{GY}(l)$, $f_{GZ}(l)$, $f_{BX}(n)$, $f_{BY}(n)$, and $f_{BZ}(n)$ in step C are cubic polynomial functions.

11. The white balance adjusting method according to claim 6, wherein the step D particularly comprises according to the set chromaticity, the established relationships between spectral tristimulus values of three colors RGB in the white field of respective gray levels and the polynomial functions of spectral tristimulus values of red, green, and blue of respective gray levels particularly being:

$$X_s = a_{max} * (Y_s/b_{max}) = f_{RX}(m) + f_{GX}(l) + f_{BX}(n);$$

$$Y_s = [(s/\max)^E * (Y_{max} - Y_0)] + Y_0 = f_{RY}(m) + f_{GY}(l) + f_{BY}(n);$$

$$Z_s = (1 - a_{max} - b_{max}) * (Y_s/b_{max}) = f_{RZ}(m) + f_{GZ}(l) + f_{BZ}(n);$$

where $X_s$, $Y_s$, $Z_s$ are spectral tristimulus values, s is a gray level number.

12. The white balance adjusting method according to claim 6, wherein the step E particularly comprises:

E1. predetermining the deviation Δm of the gray level values of spectral tristimulus values of red in the white field of respective gray levels, the deviation Δl of the gray levels of spectral tristimulus values of green in the white field of respective gray levels and the deviation Δn of the gray level values of spectral tristimulus values of blue in the white field of respective gray levels;

E2. calculating ΔX, ΔY, and ΔZ according to the following formulas:

$$X_s' = f_{RX}(m+\Delta m) + f_{GX}(l+\Delta l) + f_{BX}(n+\Delta n);$$

$$Y_s' = f_{RY}(m+\Delta m) + f_{GY}(l+\Delta l) + f_{BY}(n+\Delta n);$$

$$Z_s' = f_{RZ}(m+\Delta m) + f_{GZ}(l+\Delta l) + f_{BZ}(n+\Delta n);$$

$\Delta X = X_s' - X_s;$ $\Delta Y = Y_s' - Y_s;$ $\Delta Z = Z_s' - Z_s;$ if $\Delta X$, $\Delta Y$, and $\Delta Z$ un-match the above, then go to step E3;

if $\Delta X$, $\Delta Y$, and $\Delta Z$ match the above, then go to step E4;

E3. substituting m'=m+$\Delta$m, l'l+$\Delta$l, n'=n+$\Delta$n, into the following formula:

$$\begin{vmatrix} \Delta m \\ \Delta l \\ \Delta n \end{vmatrix} = \begin{vmatrix} \delta[f_{RX}(m') + f_{GX}(l') + f_{BX}(n')]/\delta m' & \delta[f_{RX}(m') + f_{GX}(l') + f_{BX}(n')]/\delta l' & \delta[f_{RX}(m') + f_{GX}(l') + f_{BX}(n')]/\delta n' \\ \delta[f_{RY}(m') + f_{GY}(l') + f_{BY}(n')]/\delta m' & \delta[f_{RY}(m') + f_{GY}(l') + f_{BY}(n')]/\delta l' & \delta[f_{RY}(m') + f_{GY}(l') + f_{BY}(n')]/\delta n' \\ \delta[f_{RZ}(m') + f_{GZ}(l') + f_{BZ}(n')]/\delta m' & \delta[f_{RZ}(m') + f_{GZ}(l') + f_{BZ}(n')]/\delta l' & \delta[f_{RZ}(m') + f_{GZ}(l') + f_{BZ}(n')]/\delta n' \end{vmatrix}^{-1} * \begin{vmatrix} \Delta X \\ \Delta Y \\ \Delta Z \end{vmatrix}$$

to obtain new $\Delta m$, $\Delta l$, $\Delta n$, and go to step E2;

E4. outputting the gray level numbers s, m+$\Delta$m, l+$\Delta$l, and n+$\Delta$n.

\* \* \* \* \*